(12) United States Patent
Wahl

(10) Patent No.: US 11,260,572 B2
(45) Date of Patent: Mar. 1, 2022

(54) APPARATUS AND METHOD FOR MOLDING PLASTIC PREFORMS INTO PLASTIC CONTAINERS WITH CHANGEOVER ROBOT

(71) Applicant: KRONES AG, Neutraubling (DE)

(72) Inventor: Matthias Wahl, Langquaid (DE)

(73) Assignee: KRONES AG, Neutraubling (DE)

( * ) Notice: Subject to any disclaimer, the term of this patent is extended or adjusted under 35 U.S.C. 154(b) by 18 days.

(21) Appl. No.: 16/642,635

(22) PCT Filed: Sep. 10, 2018

(86) PCT No.: PCT/EP2018/074290
§ 371 (c)(1),
(2) Date: Feb. 27, 2020

(87) PCT Pub. No.: WO2019/048673
PCT Pub. Date: Mar. 14, 2019

(65) Prior Publication Data
US 2020/0346387 A1    Nov. 5, 2020

(30) Foreign Application Priority Data

Sep. 8, 2017 (DE) ..................... 10 2017 120 774.0

(51) Int. Cl.
| | |
|---|---|
| *B29C 49/36* | (2006.01) |
| *B25J 11/00* | (2006.01) |
| *B25J 15/00* | (2006.01) |
| *B25J 17/02* | (2006.01) |
| *B29C 31/00* | (2006.01) |

(Continued)

(52) U.S. Cl.
CPC ............ *B29C 49/36* (2013.01); *B25J 11/005* (2013.01); *B25J 15/00* (2013.01); *B25J 17/0241* (2013.01); *B29C 31/006* (2013.01); *B29C 49/48* (2013.01); *B29C 49/56* (2013.01); *B29C 2049/4858* (2013.01); *B29C 2049/4864* (2013.01); *B29C 2049/566* (2013.01); *B29L 2031/712* (2013.01)

(58) Field of Classification Search
None
See application file for complete search history.

(56) References Cited

FOREIGN PATENT DOCUMENTS

| | | |
|---|---|---|
| DE | 202009018781 U1 | 7/2013 |
| DE | 102013113074 A1 | 5/2015 |

(Continued)

OTHER PUBLICATIONS

International Search Report dated Dec. 17, 2018 for PCT/EP2018/074290.

*Primary Examiner* — Monica A Huson
(74) *Attorney, Agent, or Firm* — Schmeiser, Olsen & Watts, LLP

(57) ABSTRACT

Provided is an apparatus for molding plastic preforms into plastic containers, with at least one blow molding arrangement, which includes at least a first mold carrier, a second mold carrier and a blow-molding device having at least two blow mold side parts and a base part, wherein the blow molding device can be releasably arranged on the mold carriers via a locking mechanism and forms a cavity inside which the plastic preforms can be molded into the plastic containers, wherein during the molding process, the mold carriers can be latched together by a latching device, and the apparatus includes a changeover robot which is suitable and intended for extracting the blow-molding device in an assembled state from the mold carriers.

13 Claims, 4 Drawing Sheets

Figure 1:
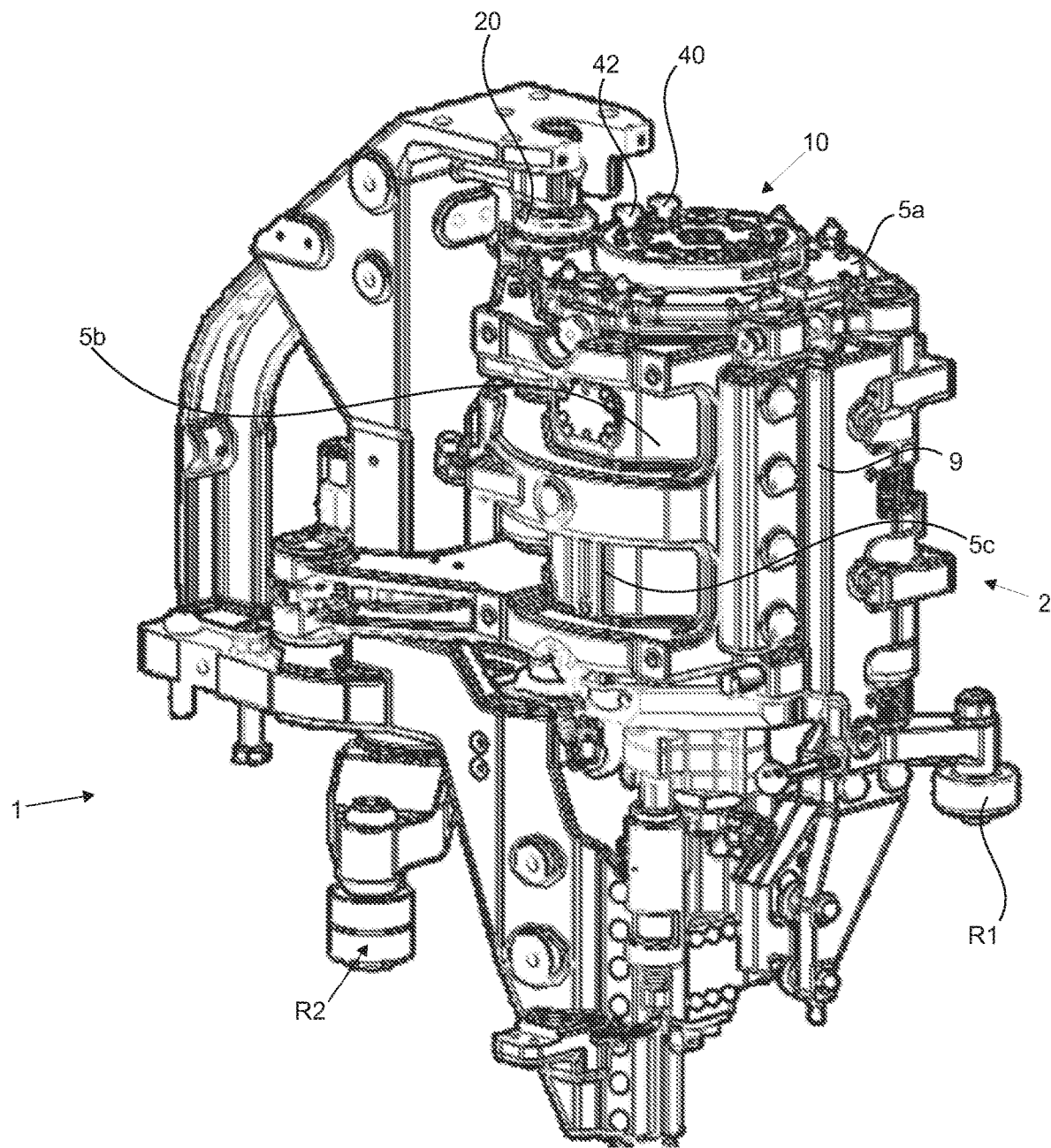

(51) Int. Cl.
*B29C 49/48* (2006.01)
*B29C 49/56* (2006.01)
*B29L 31/00* (2006.01)

(56) References Cited

FOREIGN PATENT DOCUMENTS

| | | | |
|---|---|---|---|
| DE | 102015122324 | A1 | 6/2017 |
| EP | 2080606 | A2 | 7/2009 |
| EP | 2698239 | B1 | 2/2014 |
| EP | 2475514 | B1 | 4/2014 |
| EP | 2878423 | A1 | 6/2015 |
| EP | 2683541 | B1 | 5/2016 |

APPARATUS AND METHOD FOR MOLDING PLASTIC PREFORMS INTO PLASTIC CONTAINERS WITH CHANGEOVER ROBOT

CROSS-REFERENCE TO RELATED APPLICATIONS

This application claims priority to PCT Application No. PCT/EP2018/074290, having a filing date of Sep. 10, 2018, based on German Application No. 10 2017 120 774.0, having a filing date of Sep. 8, 2017, the entire contents both of which are hereby incorporated by reference.

FIELD OF TECHNOLOGY

The following relates to an apparatus and a method for molding plastic preforms into plastic containers with a blow-molding arrangement. Such blow-molding arrangements have been known for a long time in the conventional art. Heated plastic preforms are molded into plastic containers, such as in particular plastic bottles, by bombardment with a liquid or gaseous medium, and in particular compressed air. To this end, usually a plurality of blow-molding arrangements or molding stations is arranged on a rotatable carrier. These blow-molding arrangements each comprise a blow-molding device which is decisive for the shape of the plastic containers to be produced. The blow-molding devices form a cavity inside which the plastic preforms are moulded into the plastic containers, and accordingly constitute a negative or negative mould of the container to be produced. These blow-molding devices are also usually arranged releasably on mold carriers which can be opened and closed for insertion and changing of the blow-molding devices, and for extraction of the molded plastic containers from the blow-molding devices. The blow-molding devices must be changed when a different container shape from before is to be produced using the apparatus.

BACKGROUND

In the conventional art (EP2080606A2), for this the mold carriers are opened by means of additional curves or a pneumatic infeed of curves, and then the blow-molding devices are extracted e.g. by a robot. For this, at least one guide or curve roller is provided on the blow-molding arrangement and guided inside the curve. Such additional guide curves however greatly increase the maintenance complexity because of the wear on these curves. Also, because of these guide curves, the apparatus takes up more space, and the curves also constitute an additional source of faults since for example there is a risk that the rollers guided inside the curves will seize therein.

Another procedure known from the conventional art for changing blow-molding devices proposes to extract these individually, and in particular manually, from the respective blow-molding arrangements or molding stations. An operator extracts the individual blow-molding devices and replaces them with new blow-molding devices which are to form the corresponding new containers. Because of this manual changeover process, changing the blow-molding devices takes a relatively long time, wherein during this time the blow-molding machine is stationary and accordingly produces no plastic containers.

It is also known to exchange blow molds not successively as individual parts, but as an entire mold set in order to significantly reduce the changeover time on conversion to another container shape (EP2698239B1, EP2475514B1). This may be done manually or automatically, for example by a robot.

Despite the use of robots, here additional mechanical, pneumatic and electrical units must be provided in order to enable the robot to exchange the blow molds (see EP2683541B1, in particular FIG. 9).

SUMMARY

An aspect relates to an exchange and extraction of the blow-molding devices and automating this process further so as to reduce the stoppage times of blow-molding machines.

An apparatus according to embodiments of the invention for molding plastic preforms into plastic containers has at least one blow-molding arrangement, which comprises at least a first mold carrier, a second mold carrier and a blow-molding device having at least two blow mold side parts and a base part. The blow-molding device can be arranged releasably on the mold carriers via a locking mechanism and forms a cavity inside which the plastic preforms can be molded into the plastic containers. During the molding process, the mold carriers can be latched together by means of a latching device. The apparatus also comprises a changeover robot which is suitable and intended for extracting the blow-molding device, in an at least partially assembled state, from the mold carriers.

According to embodiments of the invention, in a changeover mode, the mold carriers are opened and/or closed exclusively by the changeover robot, and in particular operated (opened/closed). If a mold carrier latching mechanism is provided, which in closed state latches two mold carriers together, the unlatching and/or latching may be carried out exclusively by the changeover robot. Also, the lock or locking mechanism of the blow-molding device on the mold carriers may in some cases be actuatable (released/attached) exclusively by the changeover robot, in particular be releasable.

In preferred embodiments, in an unlatched state, the blow-molding device can be connected at least temporarily to the mold carriers or to a base carrier by means of a securing device. This may take place for example with mechanical elements or magnets, in particular electromagnets.

In advantageous embodiments, a plurality of blow-molding arrangements is arranged on a common movable carrier. This carrier is in particular a rotatable carrier. Advantageously, a plurality of such blow-molding arrangements is arranged inside a blow-molding machine, and particularly inside a stretch blow-molding machine. This means that the plastic preforms are expanded into the plastic containers by bombardment with a fluid and in particular a gaseous medium, such as compressed air. In a further advantageous embodiment, the blow molds each have stretching rods which stretch the plastic preforms in their longitudinal direction. Particularly, the blow-molding machine or the carrier and the blow-molding arrangements is/are arranged inside a clean room which isolates the blow-molding machine from a non-sterile environment. Drive devices for closing, latching and/or opening the blow molds are situated outside the clean room.

Advantageously, at least two parts and particularly all three parts of the blow-molding device can be latched together so that the blow mold can be removed as a whole from the machine or from the mold carrier. The mold carrier is thus suitable for receiving different blow-molding devices. It would be possible that the blow-molding device itself is also arranged on the mold carriers by means of mold carrier shells, wherein with such a structure, the mold carrier shells are arranged between the blow-molding device and the mold carriers.

A changeover mode is an operating mode which differs from a working mode in which the plastic preforms are molded into plastic containers. In particular, in changeover mode, no plastic preforms, or plastic containers are situated inside the blow-molding arrangement or blow-molding machine. Such a changeover mode may be initiated by the operating personnel, for example via a control panel arranged on the blow-molding machine.

As stated, the latching device of the mold carriers may also be released by the changeover robot. Alternatively, it is also conceivable that the locking mechanism or blow mold latching mechanism is released at the same time pneumatically or electromagnetically, instead of by the changeover robot as described above.

Advantageously, the locking mechanism can be actuated or moved, and in particular released for insertion of a new blow-molding device, and also latched again, automatically by a fluid medium and in particular a gaseous medium, or by magnetic force.

Accordingly, in embodiments of the invention it is proposed that the mold carriers are opened exclusively by the changeover robot, and not by additional curves as in the conventional art. In particular therefore, according to embodiments of the invention it is also proposed that the changeover robot both opens the mold carriers and releases the latching of the mold carriers, and/or releases the latching or locking of the blow-molding device, and extracts the blow-molding device from the mold carriers, so that a fully automatic changeover process can be provided by the changeover robot. Insertion of a new mold takes place similarly.

Thus advantageously, in addition to the changeover robot, no further devices are required for performing a fully automatic exchange of blow molds.

The levers for clamping the molds in their holders have a design which allows manipulation by the robot with the same tool which is used for holding or removing the mold. Advantageously, the changeover robot accordingly comprises a tool which is configured such that it is suitable and intended for opening the mold carriers and/or actuating the latching of the mold carriers and the blow-molding device, and/or for removing and holding the blow-molding device. An advantage of the changeover robot according to embodiments of the invention also lies in that only a single tool is required for changing the blow-molding device, whereby the changeover process can also be substantially simplified.

The locking mechanism of the blow-molding devices and/or the latching device of the blow molds is selected from a group of locking or latching mechanisms which contain mechanical, magnetic or pneumatic locks/latches, clamping levers, locking/latching via a vacuum, combinations of at least two or more of the locks/latches, or similar.

The above-mentioned securing device serves in particular to secure the mold (blow-molding device) so that after opening of the mold carriers, the mold does not fall out of the mold carriers. The securing device also ensures that the robot has sufficient time to pivot upward away from the locking mechanism in order to receive the mold on its end face, and away from the latching device of the mold carriers, and then to remove the mold in the assembled state.

Advantageously, for opening and closing the mold carriers, the mold carriers are arranged so as to be movable on a common shaft bearing and in particular pivotable thereon. The shaft bearing therefore forms a pivot axis for the mold carriers.

In preferred embodiments, the blow mold side parts and/or the base part can each be moved independently of each other, wherein for this a coupling may be provided at the coupling point (curve of mold carrier/base), in particular an electromagnetic coupling, so as to decouple the movements of the blow mold side parts and base part from each other.

In further preferred embodiments, the changeover robot has a gripper device which is pivotable about at least one pivot axis. The gripper device is pivotable about at least three different axes, and particularly, the gripper device is pivotable about more than three, about at least four, at least five, and particularly at least six pivot axes. In addition, the gripper device can also be movable in at least two different directions, and in particular in directions which are not parallel to or opposite each other. The changeover robot is accordingly, particularly, a six-axis robot with at least two pivot arms on which a gripper device is arranged.

The gripper device is configured such that it is suitable and intended for opening the mold carriers, and/or for releasing the lock between the blow-molding device and the mold carriers, and/or for extracting the blow-molding device from the mold carriers and holding this. The gripper device is also suitable and intended for releasing the latching of the mold carriers.

In further advantageous embodiments, the gripper device has at least one recess for gripping a protrusion arranged on the blow-molding device, which in particular is a pin corresponding to the recess. Advantageously, the gripper device has two such recesses for gripping two pins arranged on the blow-molding device. Such a pin may be arranged on the first and on the second blow mold side parts respectively, and during transport the gripper device may reach behind the pin in order to hold the blow-molding device together as a whole.

In further advantageous embodiments, the gripper device can be connected to the blow-molding device by form fit and/or force fit, and in particular the recesses and the pins can be connected together by form fit and/or force fit. In this way, secure gripping and transport of the blow-molding devices by means of the changeover robot are possible, wherein also transport at high speeds is possible.

In further advantageous embodiments, the gripper device has a passive gripper element. This means that the blow-molding device is not held by an active gripping movement of the gripper element, such as a clamping movement, but merely by correct positioning of the gripper element or gripper device relative to the blow-molding devices to be transported. Thus, in particular an element of the gripper device may reach behind a portion of the blow-molding device.

In addition, it would also be possible for the gripper device to have a magnetic or magnetisable element for holding and/or gripping the blow-molding device. Thus, the gripper device could comprise an electromagnet which can be activated as soon as the gripper device is in a predefined position relative to the blow-molding device. Also, the gripper device could trigger a magnetic connection between parts of the blow-molding device, wherein for this in particular permanent magnets or electromagnets may be arranged in the blow mold side parts and/or the base part.

In further advantageous embodiments, the changeover robot has a control device which extracts the blow-molding device from the mold carriers and/or arranges the blow-molding device on the mold carriers under control of both force and travel. Detection devices may be provided which detect a movement, in particular of the gripper device, and detection devices may also be provided for measuring forces.

Thus, with this control system, it is also possible to define one or more reference points on the blow-molding arrangement and/or the blow-molding device, to which the changeover robot can travel. In this way, the exact geometric position of the blow-molding device can be determined at any time during the transport, and/or also displayed on a control panel. Furthermore, it is possible that the gripper device can be deflected in several degrees of freedom, for example in an X, Y and Z direction, in particular in order to equalise inaccuracies in positioning. It would however also be possible that one or more of these degrees of freedom can be blocked electromechanically. In this way, a faster working mode of the apparatus can be achieved.

In further advantageous embodiments, the gripper device has active elements which create a form fit and/or force fit with the blow-molding device. Here it is possible that the gripper device creates a form-fit connection between the two side parts of the blow-molding device, and furthermore creates a force-fit and/or form-fit connection between the blow mold side parts and the base mold. This second connection with the base mold may be achieved via corresponding engagement elements of the side parts and/or base mold, such as for example a centring ring.

In further preferred embodiments, accordingly at least one and both blow mold side parts have a fixing device and in particular a centring ring, wherein the blow mold side parts and the base part can be connected together by form fit and/or force fit by means of this centring ring. The base part is accordingly held on the blow mold side parts in particular by form fit and/or force fit.

In advantageous embodiments, the blow mold side parts and/or the base part have at least one permanent magnet, wherein the blow mold side parts and the base part can be connected together by force fit by means of this permanent magnet. The permanent magnets may here be provided alternatively or additionally to the above-mentioned centring ring.

The changeover robot here extracts the entire blow-molding device from the blow-molding arrangement in just one work process. It would also be conceivable that the changeover robot for example merely exchanges the blow mold side parts while the base part remains in the blow-molding arrangement. This is advantageous in particular if the new plastic containers to be produced differ from the previous containers only in the side parts, while the base part remains the same. Conversely, it would also be conceivable that only the base part is exchanged while the blow mold side parts remain in the blow-molding arrangement.

In further preferred embodiments, the changeover robot is accordingly suitable and/or intended for exchanging either a complete blow-molding device or merely individual parts of the blow-molding device.

In further advantageous embodiments, the above-mentioned securing device is a clamp which is arranged on at least one mold carrier, wherein the clamp engages on at least one pin arranged on the blow-molding device in order to hold the blow-molding device on the mold carriers, and in particular inside the mold carriers. The clamp accordingly ensures that the blow-molding device does not fall out of the mold carriers, despite the locking between the blow-molding device and the mold carriers having already been released and/or the mold carriers having already been opened.

The clamp holds the blow-molding device at a predefined position inside the mold carriers or inside the blow-molding arrangement. This predetermined position is in particular a position in which the longitudinal axis of the blow-molding device is parallel to the longitudinal axis of the blow-molding arrangement, or in which the longitudinal axis of the blow-molding device is identical to the longitudinal axis of the blow-molding arrangement.

Advantageously, the clamp is connected to a control device which releases the clamp from the blow-molding device as soon as the changeover robot grips the pins of the blow-molding device. However, it would also be conceivable that the changeover robot releases the clamp, and in particular that the changeover robot simultaneously grips the blow-molding device and releases the clamp.

In preferred embodiments, the clamp is formed in two parts, wherein a first part of the clamp is arranged on the first mold carrier and a second part of the clamp on the second mold carrier. At least part of the clamp is movable relative to the other part, and particularly both parts of the clamp are movable relative to each other. Advantageously, the clamp is here also arranged on the above-mentioned shaft bearing on which the mold carriers are also arranged, and in particular the clamp and/or the first and the second part of the clamp is/are arranged pivotably on the shaft bearing. The above-mentioned control device also ensures that the clamp grips the pin as soon as the locking mechanism of the blow mold carriers is released, and/or the latching device of the mold carriers is released, and/or the mold carriers are opened. In particular, the securing device or the clamp is accordingly activated as soon as the locking mechanism of the blow mold carriers has been released, and particularly the securing device of the clamp is deactivated again as soon as the blow-molding device is gripped by the changeover robot.

Alternatively, it would also be conceivable for the clamp to be arranged on the pin of the blow-molding device manually by an operator after release of the locking mechanism of the blow-molding device and/or the latching device of the mold carriers and/or after opening of the mold carriers by the changeover robot. The clamp could be released automatically as soon as the changeover robot grips the blow-molding device.

In addition, the clamp could also be formed as one piece, wherein the clamp is arranged on the shaft bearing. This one-piece clamp executes a movement in the longitudinal direction of the blow-molding arrangement and grips the blow-molding device at a pin arranged on the blow-molding device. The one-piece clamp could also be arranged pivotably on the shaft bearing, and on the pin arranged on the blow-molding device, by pivoting of the clamp perpendicularly to the longitudinal direction of the blow-molding arrangement. The gripping or release of the pin or the blow-molding device may be controlled in the same way as in the two-piece clamp.

In further advantageous embodiments, the above-mentioned securing device is implemented, instead of by a clamp, in such a fashion that, after release of the locking mechanism of the blow-molding device, at least temporarily, the base part can be fixed on a base carrier and the blow mold side parts can be fixed to the base part. So that the blow-molding device does not fall out of the mold carriers, the base part is firstly temporarily attached to the blow mold base holder, and the rest of the mold halves are attached thereto. This fixing to the base carrier may take place mechanically, pneumatically or electromagnetically, or e.g. via electromagnets. When an electromagnet is used in the base form holder or base carrier, this can be switched off for removal after gripping of the blow-molding device in order to facilitate removal. This fixing may also take place with the above-mentioned permanent magnet and/or centring ring.

Embodiments of the invention are furthermore aimed at a method for molding plastic preforms into plastic containers, with at least one blow-molding arrangement which comprises at least a first mold carrier, a second mold carrier and a blow-molding device having at least two blow mold side parts and a base part, wherein the blow-molding device can be releasably arranged on the mold carriers via a locking mechanism and forms a cavity inside which the plastic preforms can be molded into the plastic containers by bombardment with a fluid medium, wherein during the molding process, the mold carriers can be latched together by means of a latching device, and a changeover robot is provided for extracting the blow-molding device from the mold carriers, and extracts the blow-molding device in an assembled state.

According to embodiments of the invention, in a changeover mode, the mold carriers are opened exclusively by the changeover robot itself, and/or the locking mechanism of the blow-molding device on the mold carriers is released exclusively by the changeover robot itself. In a preferred embodiment, after release of this locking mechanism, the blow-molding device is connected at least temporarily to the mold carriers or to a base carrier by means of a securing device.

Accordingly, it is also proposed in the method that, on a mold change, the mold carriers are opened/closed exclusively by the changeover robot, and not as in the conventional art by additional curves or similar elements. Also, in the method, in particular the latching of the mold carriers is actuated by the changeover robot. Particularly, the changeover robot performs the latching or locking of the blow-molding device. The removal/insertion of the blow-molding device from/into the mold carriers is performed by the changeover robot.

Advantageously, the changeover robot is accordingly suitable and intended for opening the mold carriers, and/or releasing the locking of the mold carriers and the blow-molding device, and/or extracting and holding the blow-molding device.

In a preferred method, after release of the locking mechanism, the changeover robot is pivoted away from the locking mechanism, and/or after opening of the mold carriers, away from the latching device, to an extraction point of the blow-molding device. The blow-molding device is removed from mold carriers at this extraction point.

In a particularly preferred method, firstly the latching of the mold carriers is released, then the locking of the blow-molding device is released, then the mold carriers are opened, and then the changeover robot is pivoted upward to the extraction point in order to remove the blow-molding device from the mold carriers.

So that the mold does not fall out of the mold carriers after release of the locking mechanism of the blow-molding device which holds the blow-molding device on the mold carriers, the base mold is firstly temporarily fixed to the blow mold base holder or base carrier and the remainder of the blow mold side parts or the entire blow-molding device is temporarily attached to the mold carriers. This can be achieved by one or more of the possibilities described above, such as for example a clamp, a centring ring, one or more permanent magnets or one or more electromagnets.

This temporary fixing of the blow-molding device serves also in particular to ensure that the robot is thereby given sufficient time to pivot upward away from the locking mechanism in order to receive the mold on its end face, or away from the latching device of the mold carriers, and then to remove the mold in the assembled state.

In a preferred method or preferred apparatus, the changeover robot is integrated into the blow-molding machine, wherein as already mentioned above, the changeover mode in which the blow-molding device is exchanged by the changeover robot may be started by an operator.

A plurality of blow-molding arrangements is arranged on a common carrier. Advantageously, the carrier is a rotatable carrier, such as in particular a blowing wheel. The individual blow-molding arrangements or molding stations are arranged on an outer periphery of this rotatable carrier, and in working mode are moved along a circular transport path.

In further preferred embodiments, the changeover robot moves inside a limited working region which the operator cannot and/or must not access for safety reasons. To isolate this region, special safety devices and/or barriers are provided.

It is advantageously possible here that the working region of the changeover robot is limited by safety devices and in particular mechanically. Such a delimitation would be possible by various measures, such as by light barriers which detect an incorrect or excessive movement of the changeover robot and then cause either a reversal or an emergency stop of the changeover robot. Advantageously, the light barrier may detect when an operator infringes or enters the working region of the changeover robot, and in response again causes a stoppage of the changeover robot. However, it would also be possible to isolate the working region by mechanical elements, such as for example by stops.

Also, it would also be possible for a working region of the changeover robot to be monitored by safety devices and electrically or also via a control system. In particular, it is possible that this working region is (further) restricted, by deviation from a maximal possible working region.

On use of a cooperating robot, the safety devices may be substantially reduced in comparison with a conventional industrial robot (e.g. articulated robot).

BRIEF DESCRIPTION

Figure 2:
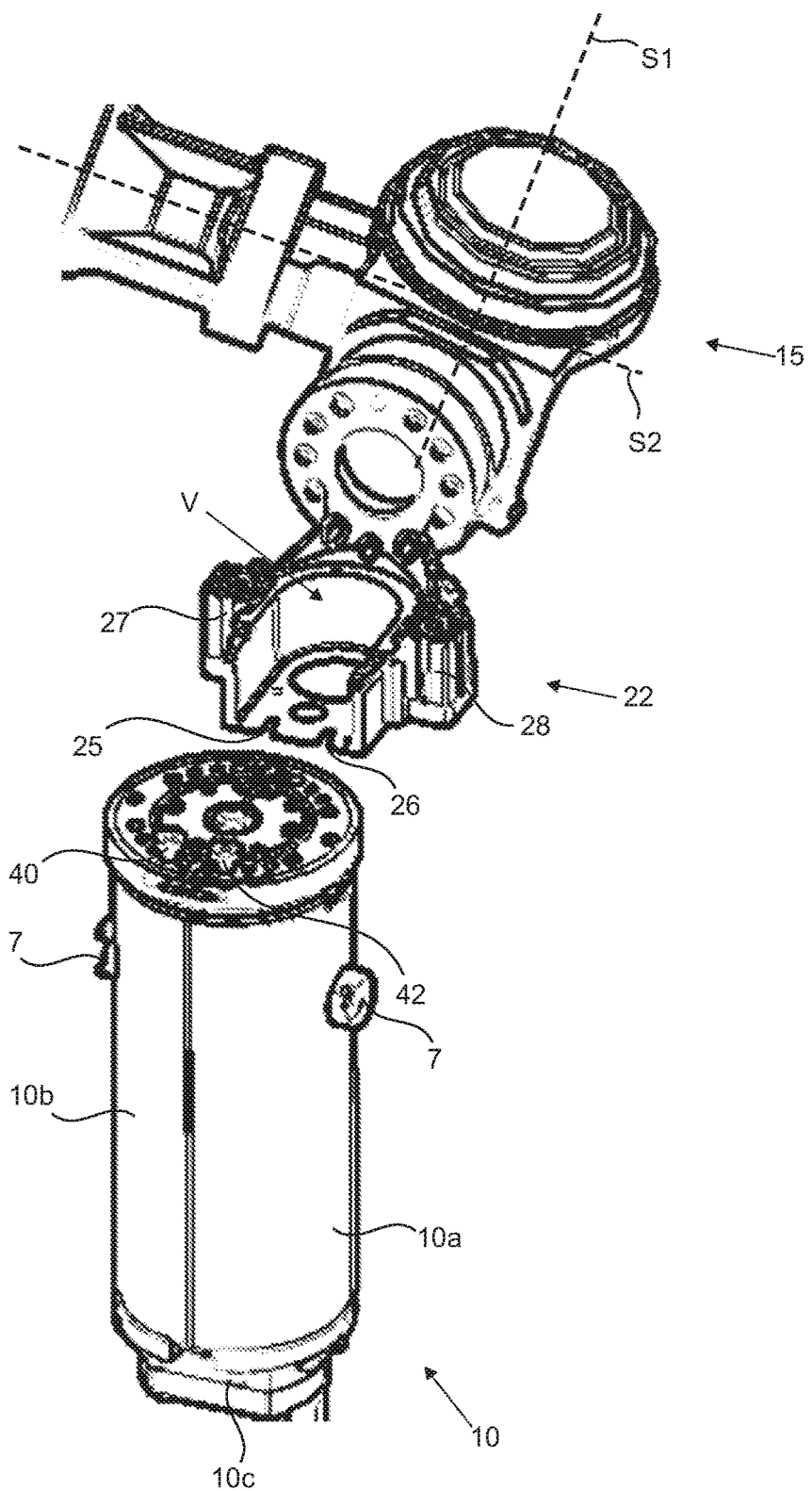
Figure 3:
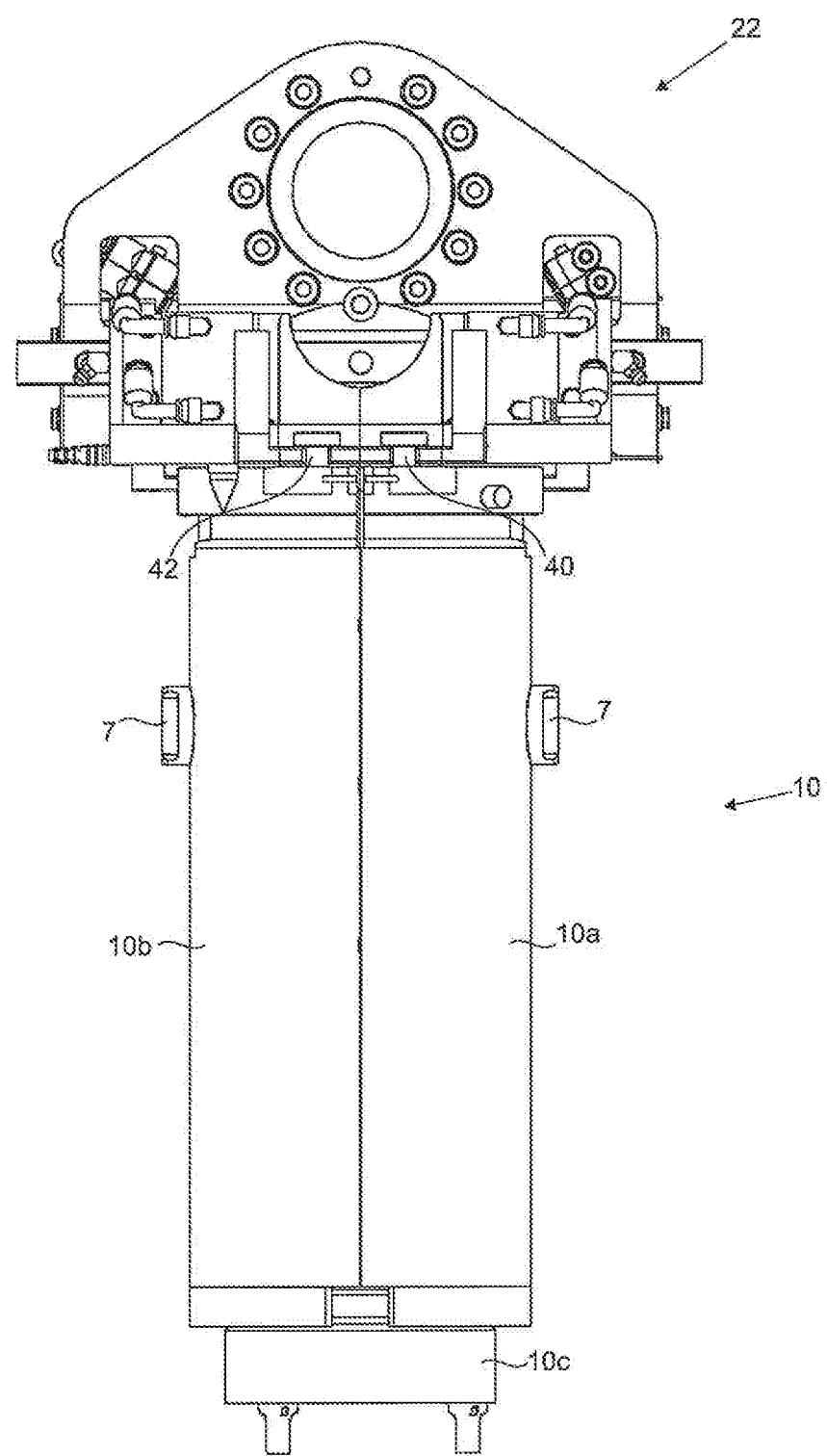
Figure 4:
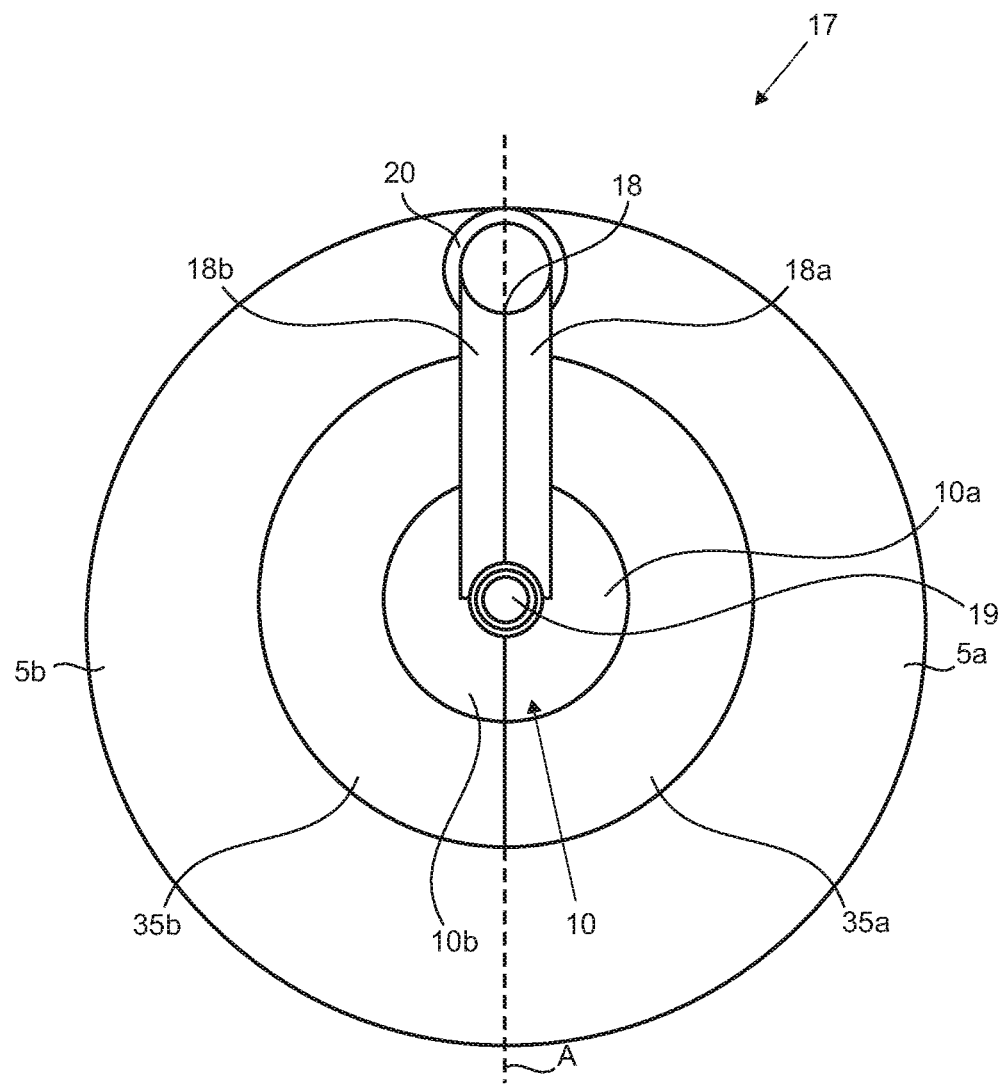

Some of the embodiments will be described in detail, with reference to the following figures, wherein like designations denote like members, wherein:

FIG. 1 a diagrammatic depiction of a blow-molding arrangement;

FIG. 2 a partial illustration of a changeover robot for exchanging a blow-molding arrangement;

FIG. 3 a further partial illustration of a changeover robot with gripped or removed blow-molding arrangement; and FIG. 4 a diagrammatic depiction of a blow-molding arrangement with securing device.

DETAILED DESCRIPTION

FIG. 1 shows a diagrammatic depiction of a blow-molding arrangement 2, or an apparatus for molding plastic preforms into plastic containers. Here, two mold carriers 5a, 5b can be seen which can be pivoted apart for opening and closing the blow-molding device 10, and also the base carrier 5c. For changeover mode, the two mold carriers 5a, 5b are pivoted apart so that the blow-molding device 10 can be extracted, and in particular the mold carriers 5a, 5b can be opened by the changeover robot, wherein here firstly a latching device 9 must be released which, in working mode, latches the two blow mold side parts 10a and 10b and mold carriers 5a, 5b together so that they do not pivot apart even under high pressures. Reference sign 20 designates the shaft bearing on which the mold carriers 5a, 5b are arranged, and about which the mold carriers are pivotable for opening and closing the blow-molding arrangement 3.

Reference signs 40 and 42 furthermore refer to protrusions or pins which are arranged on the respective blow mold side part 10a, 10b of the blow-molding device 10. These pins are designed to be sufficiently stable for the entire blow-molding device 10 to be able to be supported on these pins. The changeover robot or part of the changeover robot can reach behind these pins 40, 42, so that the changeover robot can support the blow-molding device 10 via these protrusions or pins 40, 42. The blow-molding device 10 can also be held together as a whole for example via permanent magnets on the blow mold side parts 10a, 10b and/or the base part of the blow-molding device 10.

Reference signs R1 and R2 designate rollers, via which the blow-molding arrangement 2 can be opened or closed and unlatched or latched. For this, the gripper device 22 has a depression V (FIG. 2). This depression V of the gripper device (or in general the gripper) serves to grip and move the rollers R1 and R2. Accordingly, when roller R2 is gripped, the gripper can move the roller R2 between a position in which the mold carrier is opened and a position in which the mold carrier is closed. When roller R1 is gripped, the gripper can move the roller R1 between a position in which the mold carrier is unlatched and one in which it is latched. The process by which the robot grips the rollers and executes the movements is actuated automatically.

FIG. 2 shows a partial illustration of a changeover robot 15 for changing a blow-molding device 10, wherein the changeover robot 15 here comprises a gripper device 22. This gripper device may have at least one and two recesses 25, 26, which can be guided over a corresponding surface of the blow-molding device and which in particular correspond to the protrusions or pins 40, 42 arranged on the blow-molding device 10, and reach behind these in order to change the blow-molding device. Thus, the recesses 25, 26 also serve to carry the blow-molding device 10. In addition, protrusions 27, 28 may also be provided which serve to centre the changeover robot 15 or gripper device 22 relative to the blow-molding device 10. The gripper device 22 is pivotable at least about pivot axes S1 and S2. Reference sign 7 diagrammatically designates the locking mechanism or lock of the blow-molding device 10, by means of which the blow-molding device 10 can be attached to the mold carriers 5a, 5b and also released again.

FIG. 3 shows a further partial illustration of a changeover robot or gripper device 22 with the blow-molding device 10 is gripped or removed. In the situation shown, the complete blow-molding device 10, i.e. both the two side parts 10a and 10b and also the base part 10c which is coupled to the side parts 10a and 10b mechanically and in particular by form fit and/or force fit, has been extracted from the blow-molding arrangement. It is in particular also evident that the pins 40, 42 arranged on the side parts 10a, 10b have been gripped by the gripper device 22 or the recesses arranged on the gripper device 22.

FIG. 4 furthermore shows a diagrammatic depiction of a blow-molding arrangement 2 with a securing device 17, wherein here the blow-molding arrangement 2 is shown in a top view. In particular, the mold carriers 5a, 5b can be seen, together with the blow mold side parts 10a, 10b. Reference signs 35a and 35b designate optional mold carrier shells which may be arranged between the mold carriers 5a, 5b and the blow mold side parts 10a, 10b.

The securing device 17 is here configured as a clamp 18, and in particular as a two-piece clamp which has a first part 18a and a second part 18b. This clamp 18 is arranged pivotably on the shaft bearing 20 on which the mold carriers 5a, 5b are also arranged, as shown in FIG. 1. Reference sign 19 here designates a further pin which is arranged on the blow-molding device 10 and serves to be gripped by the clamp 18, by force fit and/or form fit, in order to hold the blow-molding device 10 inside the mold carriers 5a, 5b. The pin 19 is arranged centrally and in particular on the longitudinal axis in the blow-molding device 10. The clamp 18 is therefore arranged between the axis of the shaft bearing 20 and the longitudinal axis of the blow-molding device 10, and arranged substantially in an axis of symmetry A of the blow-molding arrangement 2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 Apparatus
2 Blow-molding arrangement
5a First mold carrier
5b Second mold carrier
5c Base carrier
7 Locking mechanism, lock
9 Latching device
10 Blow-molding device
10a First blow mold side part
10b Second blow mold side part
10c Base part
15 Changeover robot
17 Securing device
18 Clamp
18a First part of clamp
18b Second part of clamp
19 Pin
20 Shaft bearing
22 Gripper device
25 Recess
26 Recess
27 Protrusion
28 Protrusion
35a First mold carrier shell
35b Second mold carrier shell
40 Protrusion, pin
42 Protrusion, pin
A Axis of symmetry
R1 Roller
R2 Roller
$S_1$ Pivot axis of gripper device 22
$S_2$ Pivot axis of gripper device 22
V Depression

The invention claimed is:
1. An apparatus for molding plastic preforms into plastic containers, with at least one blow-molding arrangement, which comprises at least a first mold carrier, a second mold carrier and a blow-molding device having at least two blow mold side parts and a base part, wherein the blow-molding device can be releasably arranged on the mold carriers via a locking mechanism and forms a cavity inside which the plastic preforms can be molded into the plastic containers,
wherein during the molding process, the mold carriers can be latched together by a latching device, and the apparatus comprises a changeover robot which is suitable and intended for extracting the blow-molding device, in an at least partially assembled state, from the mold carriers, wherein in a changeover mode, the mold carriers are operated to be opened or closed exclusively by the changeover robot, and the locking mechanism of the blow-molding device on the mold carriers can be actuated to be released or attached exclusively by the changeover robot, and the latching device can be operated by the changeover robot in a changeover mode.

2. The apparatus according to claim 1, wherein in an unlatched state, the blow-molding device can be connected at least temporarily to the mold carriers or to a base carrier by a securing device.

3. The apparatus according to claim 1, wherein the changeover robot has a gripper device which is pivotable about at least one pivot axis.

4. The apparatus according to claim 2, wherein the gripper device is suitable and intended at least one of for opening the mold carriers and for releasing the locking of the blow-molding device to the mold carriers and/or for extracting the blow-molding device from the mold carriers and holding this.

5. The apparatus according to claim 1, wherein at least one and both blow mold side parts have a fixing device and a centring ring, wherein the blow mold side parts and the base part can be connected together by at least one of form fit and force fit by this centring ring.

6. The apparatus according to claim 1, wherein the at least one of the blow mold side parts and the base part comprise at least one permanent magnet, wherein the blow mold side parts) and the base part can be connected together by force fit by this permanent magnet.

7. The apparatus according to claim 1, wherein the securing device is a clamp which is arranged on at least one mold carrier part, wherein the clamp engages on at least one pin arranged on the blow-molding device in order to hold the blow-molding device on the mold carriers.

8. The apparatus according to claim 1, wherein after release of the locking of the blow-molding device, at least temporarily, the base part can be fixed on a base carrier and the blow mold side parts can be fixed to the base part.

9. The apparatus according to claim 1, wherein at least one of the locking mechanism and the latching device is selected from a group of locks consisting of mechanical, magnetic or pneumatic locks, clamping levers, locking via a vacuum, and combinations thereof.

10. A method for operating a molding device for molding plastic preforms into plastic containers, with at least one blow-molding arrangement, which comprises at least a first mold carrier, a second mold carrier and a blow-molding device having at least two blow mold side parts and a base part, wherein the blow-molding device can be releasably arranged on the mold carriers via a locking mechanism and forms a cavity inside which the plastic preforms can be molded into the plastic containers by bombardment with a fluid medium, wherein during the molding process, the mold carriers can be latched together by a latching device, and a changeover robot is provided for extracting the blow-molding device from the mold carriers, and extracts the blow-molding device in an assembled state, comprising the steps of: in a changeover mode, the mold carriers are opened exclusively by the changeover robot, and the locking mechanism of the blow-molding device on the mold carriers is released exclusively by the changeover robot.

11. The method according to claim 10, wherein after release of the locking mechanism, the blow-molding device is connected at least temporarily to the mold carriers or to a base carrier by a securing device.

12. The method according to claim 10, wherein after release of the locking mechanism, the changeover robot is at least one of pivoted away from the locking mechanism, and after opening of the mold carriers, away from the latching device, to an extraction point of the blow-molding device.

13. A method for operating a molding device for molding plastic preforms into plastic containers, comprising:
providing at least one blow-molding arrangement having a first mold carrier, a second mold carrier, and a blow-molding device having at least two blow mold side parts and a base part, wherein the blow-molding device can be releasably arranged on the mold carriers via a locking mechanism and forms a cavity inside which the plastic preforms can be molded into the plastic containers by bombardment with a fluid medium,
providing a changeover robot for extracting the blow-molding device from the mold carriers,
latching the mold carriers together by a latching device,
molding the plastic preforms into plastic containers, and
performing a changeover, the changeover including at least one of:
opening the mold carriers exclusively by the changeover robot,
actuating the locking mechanism exclusively by the changeover robot, and
operating the latching device exclusively by the changeover robot.

* * * * *